UNITED STATES PATENT OFFICE.

GUSTAF ROSENLEAF, OF GRAND FORKS, NORTH DAKOTA.

FIBER CONCRETE FOR THE CONSTRUCTION OF FIREPROOF BUILDINGS.

937,868.      Specification of Letters Patent.      Patented Oct. 26, 1909.

No Drawing.      Application filed March 11, 1907. Serial No. 361,778.

*To all whom it may concern:*

Be it known that I, GUSTAF ROSENLEAF, a citizen of the United States, residing at Grand Forks, in the county of Grand Forks and State of North Dakota, have invented a new and useful Fiber Concrete for the Construction of Fireproof Buildings, of which the following is a specification.

This invention relates to concrete for building constructions and method of making the same.

The object of the invention is to provide a fiber, cement or concrete especially designed for use in the construction of walls, partitions and other portions of fire-proof buildings, which will effectually withstand the action of the elements for an indefinite period without danger of cracking, crumbling or otherwise disintegrating.

The invention consists in taking vegetable fiber, preferably flax straw and reducing the individual fibers to relatively short lengths and subsequently combining therewith a solution consisting of sulfate of copper, sulfate of ammonium, lime and a small proportion of Portland cement or clay.

In carrying the procedure into effect the flax straw or fiber is placed in a suitable machine and chopped or ground until the individual fibers are approximately one-half an inch in length. A quantity of lime, preferably one barrel of the same, is then slaked in a separate box or receptacle and sufficient water added thereto to produce a solution having the consistency of thin white wash, after which one and one-half bushels of wet clay are added thereto and the mixture thoroughly stirred or agitated until the several parts are well blended. The sulfate copper and sulfate ammonium in the proportions of 4 pounds of sulfate ammonium to 2 pounds of the sulfate of copper are then dissolved in a small quantity of hot water and the same added to the lime solution and thoroughly incorporated therewith preferably by stirring or agitating the liquid. The liquid preparation is then sprinkled over the fiber in the receptacle and the contents of the latter thoroughly mixed by shoveling the same with a fork or other suitable tool until the liquid preparation is thoroughly incorporated with the fiber or flax straw, thus forming a sticky plastic mass of sufficient consistency to prevent the same from slopping. When Portland cement is substituted for the clay, equal parts of clean fine sand and Portland cement, say one and a half bushels of each are mixed together and incorporated with the chopped fiber or flax straw after the liquid solution has been added thereto and the several parts mixed in the manner before stated. The preparation is then removed from the box and used immediately in order to prevent the cement from setting, additional chopped straw or fiber being subsequently introduced in the box and treated in the manner before stated.

In using the concrete or plastic compound for making partitions or walls for frame buildings and similar structures, suitable strips or laths are secured to the vertical studs of the partition or wall on the inside and outside thereof, said studs being preferably first coated or saturated with a suitable water-proof compound to assist in preserving the same. Planks or boards are then placed in position on the opposite sides of the vertical studs and in contact with the strips or laths so as to form an intermediate chamber or compartment for the reception of the cement or plastic compound, the latter being thoroughly tamped in any well known manner. As the wall progresses in height the planks or boards are removed and placed in position above the finished portion of said wall and additional cement introduced in the compartment formed by the boards and tamped in the manner before described, the operation being continued until the wall or partition is completed. The laths or strips are then removed or detached from the studding and the recesses formed by said laths filled in with the plastic compound so as to present a smooth exterior surface on both the inside and outside of the wall and at the same time form a fireproof housing or casing for the studs. The exterior of the wall is then preferably coated with a solution of silicate of soda or water glass and subsequently covered with a thin layer of Portland cement mixed with fine sharp sand.

If desired a suitable pigment may be incorporated with the cement forming the exterior coating of the wall so as to give the same the desired tint or color, and said exterior coating may be molded or troweled in any fanciful shapes or designs so as to give the exterior wall an ornamental appearance.

When the fiber cement or concrete is used in the construction of out-houses, stables and other inferior buildings, the clay is preferably incorporated with the ingredients, but when used for constructing dwelling houses, office buildings and other fire-proof structures Portland cement is substituted for the clay.

While it is preferred to use flax straw as one of the ingredients of the compound it will of course be understood that swamp grass, shredded corn stalks, oat straw, wheat straw and other vegetable fiber may be used if desired.

As will be obvious, it is highly desirable to render all wood used in the construction of buildings fireproof, and further to retard the setting of the cement in order to allow it properly to be worked. By employing the proportions stated of the two sulfates, both of these objects are attained. The sulfate of ammonium acts as a retarder while the sulfate of copper acts as a fireproof agent. The properties of the lime, Portland cement, sand and water are well known, being ingredients common to many cements.

A cement or concrete formed in the manner described is strong and tough, and fire, frost and moisture proof to a high degree, and when used for constructing the walls of buildings will successfully resist the deteriorating action of the elements for an indefinite period without danger of cracking, crumbling or otherwise disintegrating.

Having thus described the invention what is claimed is:

1. A concrete consisting of comminuted vegetable fiber, a binder, slaked lime, and sulfate of copper and of ammonium, substantially in the proportions specified.

2. The herein described concrete comprising comminuted vegetable fiber, sulfate of ammonium four pounds, sulfate of copper two pounds, lime one barrel, Portland cement and clean sand of each one and a half bushels, and water.

In testimony that I claim the foregoing as my own, I have hereto affixed my signature in the presence of two witnesses.

GUSTAF ROSENLEAF.

Witnesses:
Thos. L. Lawson,
C. L. Graber.